(12) United States Patent
Pradhan et al.

(10) Patent No.: US 7,715,533 B2
(45) Date of Patent: May 11, 2010

(54) BROKERING OF INFORMATION ACQUISITION BY DEVICES IN A WIRELESS NETWORK

(75) Inventors: Salil Pradhan, Santa Clara, CA (US); James Thomas Edward McDonnell, Bristol (GB); John Deryk Waters, Bath (GB); Peter J. Macer, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1401 days.

(21) Appl. No.: 09/843,145

(22) Filed: Apr. 27, 2001

(65) Prior Publication Data
US 2002/0160793 A1    Oct. 31, 2002

(51) Int. Cl.
*H04M 1/64* (2006.01)
(52) U.S. Cl. ............... 379/88.22; 379/67.1; 379/88.08; 379/265.11
(58) Field of Classification Search ............. 455/422, 455/414, 466, 41.2; 379/67.1, 114.13, 88.15, 379/265.01–266.1, 88.04, 88.08, 88.22; 705/28, 705/14, 37, 41, 17, 40, 77; 709/204, 206, 709/245, 202; 235/472.02; 370/310, 409; 707/100; 725/36; 340/7.23
See application file for complete search history.

(56) References Cited

U.S. PATENT DOCUMENTS

| | | | | |
|---|---|---|---|---|
| 5,163,045 A * | 11/1992 | Caram et al. | ................ | 370/409 |
| 5,301,273 A * | 4/1994 | Konishi | ....................... | 709/245 |
| 5,371,807 A | 12/1994 | Register et al. | | |
| 5,790,789 A * | 8/1998 | Suarez | ....................... | 709/202 |
| 5,848,129 A * | 12/1998 | Baker | ....................... | 379/67.1 |
| 5,970,122 A * | 10/1999 | LaPorta et al. | ............. | 340/7.23 |
| 6,029,195 A | 2/2000 | Herz | | |
| 6,091,956 A | 7/2000 | Hollenberg | | |
| 6,175,743 B1 * | 1/2001 | Alperovich et al. | ......... | 455/466 |
| 6,330,590 B1 * | 12/2001 | Cotten | ....................... | 709/206 |
| 6,526,275 B1 * | 2/2003 | Calvert | ....................... | 455/418 |
| 6,532,368 B1 * | 3/2003 | Hild et al. | ................... | 455/515 |
| 6,535,132 B2 * | 3/2003 | Waters et al. | ............ | 340/573.1 |
| 6,549,625 B1 * | 4/2003 | Rautila et al. | ............... | 380/258 |

(Continued)

FOREIGN PATENT DOCUMENTS

GB    2 352 588    1/2001

(Continued)

OTHER PUBLICATIONS

"Method and Apparatus for an Electronic Billboard System," Jun. 20, 2002.

(Continued)

*Primary Examiner*—Md S Elahee

(57) ABSTRACT

A mobile telephone of an advertiser broadcasts an advertisement over a wireless short range piconet link to a mobile telephone of a consumer. The advertisement is broadcast with a predetermined set of classification tags. The consumer phone has a filter set to accept only certain advertisements. When an advertisement of interest is received by the consumer phone it requests further details automatically via the piconet link and the advertiser phone provides the further details automatically via the piconet link. The consumer phone replies to the advertisement by sending a reply message to a broker device that changes (i.e., modifies or augments the reply message text) and communicates the changed reply message to the advertiser.

31 Claims, 7 Drawing Sheets

U.S. PATENT DOCUMENTS

| | | | |
|---|---|---|---|
| 6,587,835 | B1 | 7/2003 | Trayz et al. |
| 6,650,871 | B1 | 11/2003 | Cannon et al. |
| 6,691,153 | B1 * | 2/2004 | Hanson et al. ............... 709/204 |
| 6,754,484 | B1 * | 6/2004 | Hiltunen et al. ........... 455/412.1 |
| 6,782,253 | B1 * | 8/2004 | Shteyn et al. ............ 455/414.1 |
| 6,785,682 | B2 * | 8/2004 | Todd ........................... 707/100 |
| 6,816,881 | B1 * | 11/2004 | Mohindra et al. .......... 709/203 |
| 6,947,396 | B1 * | 9/2005 | Salmi ......................... 370/310 |
| 7,024,386 | B1 * | 4/2006 | Mills et al. .................... 705/37 |
| 2001/0003189 | A1 * | 6/2001 | Miyazawa et al. .......... 709/206 |
| 2001/0011250 | A1 * | 8/2001 | Paltenghe et al. ............. 705/41 |
| 2001/0047297 | A1 * | 11/2001 | Wen ............................ 705/14 |
| 2002/0028674 | A1 * | 3/2002 | Slettengren et al. |
| 2002/0050526 | A1 * | 5/2002 | Swartz et al. .......... 235/472.02 |
| 2002/0077896 | A1 * | 6/2002 | Liu et al. |
| 2002/0161674 | A1 * | 10/2002 | Scheer ........................ 705/28 |
| 2002/0178447 | A1 * | 11/2002 | Plotnick et al. ............... 725/36 |
| 2002/0193122 | A1 | 12/2002 | Coverstone |

FOREIGN PATENT DOCUMENTS

| | | |
|---|---|---|
| WO | 97/17774 | 5/1997 |
| WO | 97/41654 | 11/1997 |
| WO | 99/01018 | 1/1999 |
| WO | 99/59283 | 11/1999 |
| WO | 01/24551 | 4/2001 |

OTHER PUBLICATIONS

"Politeness Zones for Wireless Communication Devices," Mar. 7, 2002.

* cited by examiner

| DOG FOR SALE.   DALMATION.   2 MONTHS OLD. |||||
|---|---|---|---|---|
| PRICE: $50 |||||
| LOCATION: CHICAGO – BUYER COLLECTS |||||
| WILLING TO SWAP FOR CHILDREN'S TOYS |||||
| ANIMAL | DOG | <$100 | ILLINOIS | CHICAGO |
| SELL | BUY | SWAP | TOY | CHILDREN |
| PRIVATE | COLLECT | | | |

BROKERING OF INFORMATION ACQUISITION BY DEVICES IN A WIRELESS NETWORK

FIELD OF INVENTION

This invention relates to information acquisition by devices in a wireless network. It especially, but not exclusively, relates to advertising over a wireless network, and is especially useful in short range networks, such as Bluetooth (™).

There has long been a desire to advertise goods or information on networks, usually to be exchanged for money. Spam e-mails are a fact of life, as are television advertisements and radio advertisements. Advertisements on video screens in buildings, whilst waiting in queues, and even in washrooms are known. There is so much advertising it is losing its effect on people, and people can switch off their interest as soon as they realise they are receiving an advertisement, and not pay any attention to it. This directs advertisers to use short advertisements. On the other hand, someone who is actually considering a purchase, the very person an advertiser would like to contact, may want more information to assist them.

Another problem with advertising to a mass market is that the supply of goods, or special deals, may have been exhausted by the time that a recipient of the advertisement replies to the advertisement. This can be annoying to the prospective customer. Furthermore, the usefulness of a special deal may be somewhat limited to certain customers (e.g. cheap flights from Chicago to New York may not be interesting to some one who lives in Los Angeles).

A further form of advertising is unsolicited cold-calling at a persons house, e.g. at the doorstep, or unsolicited telephone calls to try to persuade a person to buy something. This can be quite disturbing to the recipient of these personal unsolicited approaches.

There are, of course, many other forms of advertising.

It is an aim of at least one embodiment of the invention to at least try to ameliorate at least one of the aforesaid problems.

SUMMARY OF THE INVENTION

According to a first aspect the invention comprises a method of advertising comprising:

broadcasting a short range advertisement from an advertiser telecommunications device;

receiving the broadcast advertisement on a consumer telecommunications device; and replying to the advertisement via a broker device interposed in the telecommunications link between the advertiser device and the consumer device.

Thus the broker device is interposed between advertiser and consumer devices and can control what is communicated between them. It is therefore possible for the broker device to modify the message sent by the consumer device to the advertiser device, and/or to modify any follow-up message sent by the advertiser device, or a proxy or master advertising device, to the consumer device. The advertiser device may or may not include its own telecommunications address in its broadcast advertisement. It may include the telecommunications address of the broker device.

Short range is typically a few meters to something of the order of ten meters. Long distance can be of the order of a mile or miles, tens of miles, or hundreds of miles, or more.

The method may include broadcasting an advertisement including one or more advertisement classification codes which are compared with allowable advertisement codes in an advertisement screening operation by the consumer device. The consumer device may store or bring to the attention of user only those advertisements which are passed by the screening operation that it performs on the broadcast advertisements that it receives.

The consumer device may reply to an advertisement via short range, e.g. piconet, telecommunications, or via long range, e.g. cellular telephone, telecommunications. It may be preferred to reply to an advertisement via long range telecommunications because it may avoid the advertiser device knowing that the consumer device is close. The communication between the consumer device and the broker device, and/or the communication between the advertiser device and the broker device may be via long range telecommunications.

The method may comprise sending a first part of an advertisement via the short range telecommunications, and a second, preferably longer or larger, part of the advertisement via either long range or short range telecommunications. The first part may comprise substantially any advertisement classification codes. The second part may have 5, 10, 50, 100, or more, times as much data as the first part of the advertisement. The second part of the advertisement may be transmitted after the consumer device has screened the first part of the advertisement and communicated with the advertisement broker device or with the advertising device. The second part of the advertisement may be broadcast by the same advertiser device that broadcast the first part, or by a different advertiser telecommunications device.

Preferably the consumer telecommunications device is a portable, preferably a hand-portable, or pocketable, device. Preferably the advertiser device is a portable, preferably hand-portable, or pocketable, device (i.e. can be put in a normal pocket of normal clothing). One or both of the advertiser and consumer devices may comprise a mobile telephone or Personal Digital Assistant (PDA). The mobile device(s) is/are preferably portable electronic devices, which preferably have both piconet short range and long range telecommunication capabilities.

The advertisement, or first part or second part of the advertisement, may comprise an offer to sell or to buy; or it may comprise data or information that is not normally considered advertisements, for example documents or information. The method is especially useful to disseminate short-form abstracts of documents prior to a user deciding if they wish to call down longer versions/more information.

The same device may be both a consumer and advertiser device. It can be advertising one or more different advertisements and willing to consume incoming advertisements, possibly a user set profile of incoming advertisements. It may advertise and consume simultaneously, or substantially simultaneously.

It will be appreciated that by using a broker device interposed between the advertiser device and the consumer device, the consumer device may be pre-loaded with a telecoms address for the broker device and the advertisement transmitted by the advertiser device may not need to include a telecoms address for the broker device (or its own address). This can reduce the data transmitted in the advertisement a little. Furthermore, the consumer device does not have to have an automatic address-selection/entering capability for variable advertisement follow-up addresses (which would be the case if the consumer device replied directly to the advertiser device over the cellular network). Many, many, mobile telephones, or devices, may be pre-loaded with the same broker device address. A refinement is of course that there may be a plurality of different broker devices, each with their own telecoms address, and the advertisement could simply flag which of the pre-loaded addresses to use (instead of containing the full address). Much of the complexity of the processing is moved to the broker device, which allows simpler and cheaper advertiser and/or consumer devices.

It will be appreciated that whilst it is envisaged that "advertisement" will usually be something offered for monetary recompense, it may not always be so. For example, it is possible that the advertisement may comprise a circulation of the titles or abstracts of recently published papers or internal news, and the "reply to advertisement" may be a request for the full copy of the documents, with or without payment; the advertisement may comprise a request for volunteers to perform a task, and the reply may be volunteers agreeing to perform the task and enquiring more about what is expected of them.

The invention may be seen as a way of telecommunication devices acquiring information.

Embodiments of the invention will now be described by way of example only, with reference to the accompanying drawings.

BREIF DESCRIPTION OF THE DRAWING

FIG. 1 shows schematically two mobile telephones in accordance with the invention;

FIG. 2 schematically illustrates the invention;

Figure 8:
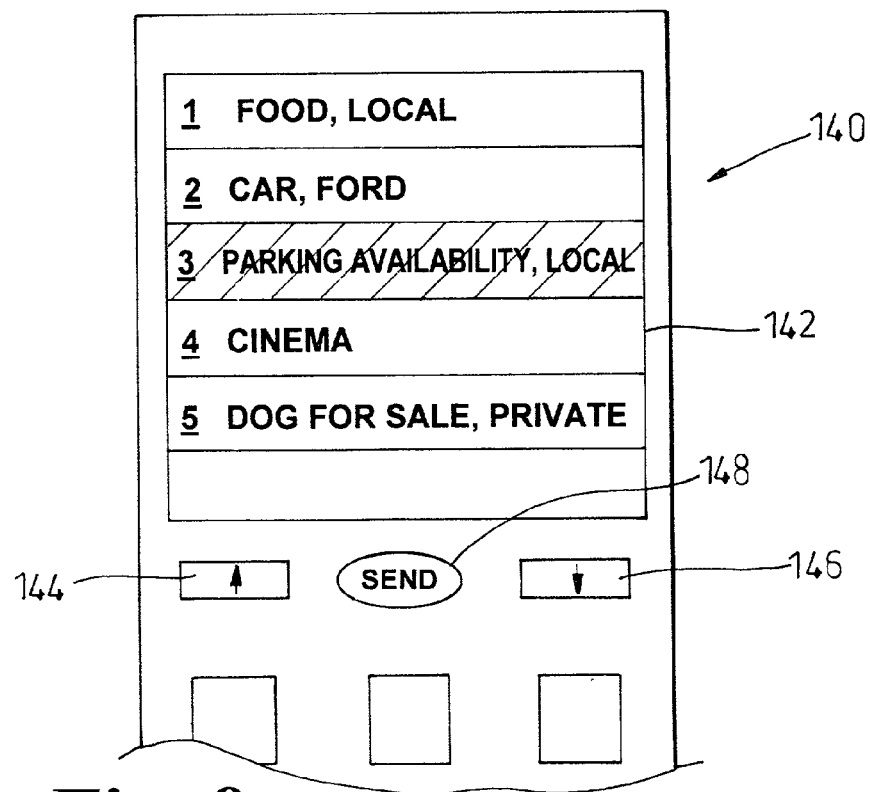
Figure 5:
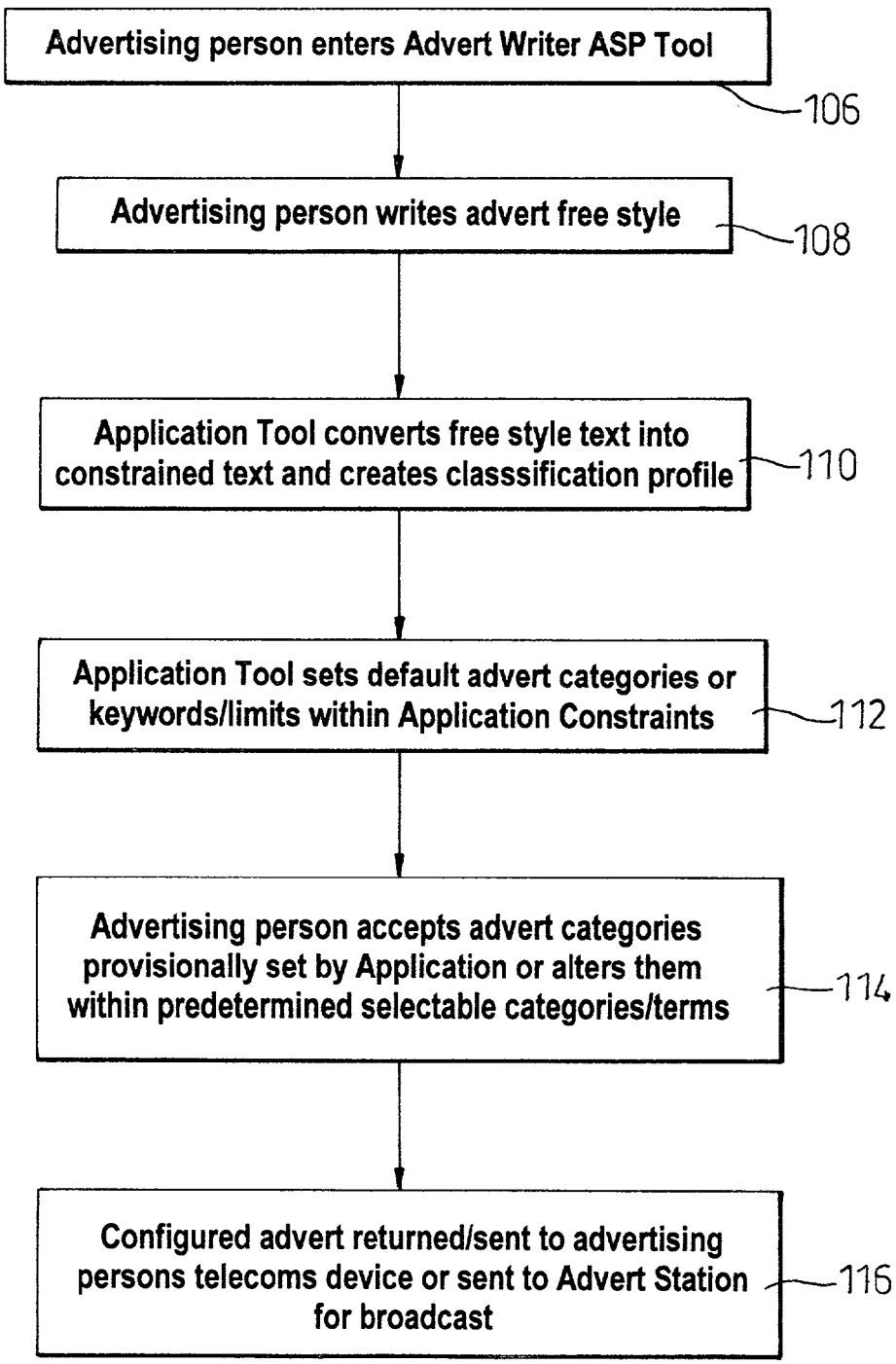
Figure 6:
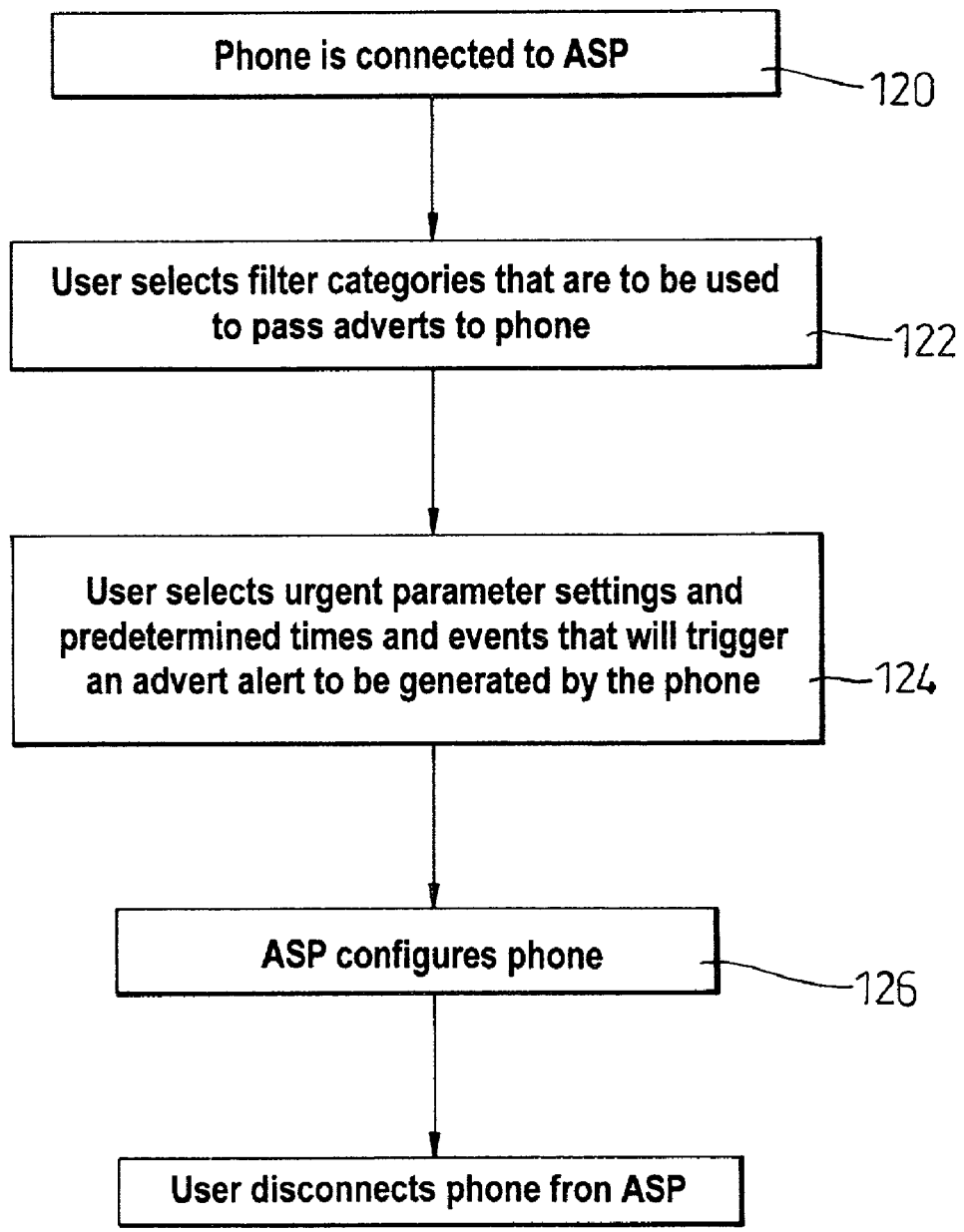
Figures 7, 9:
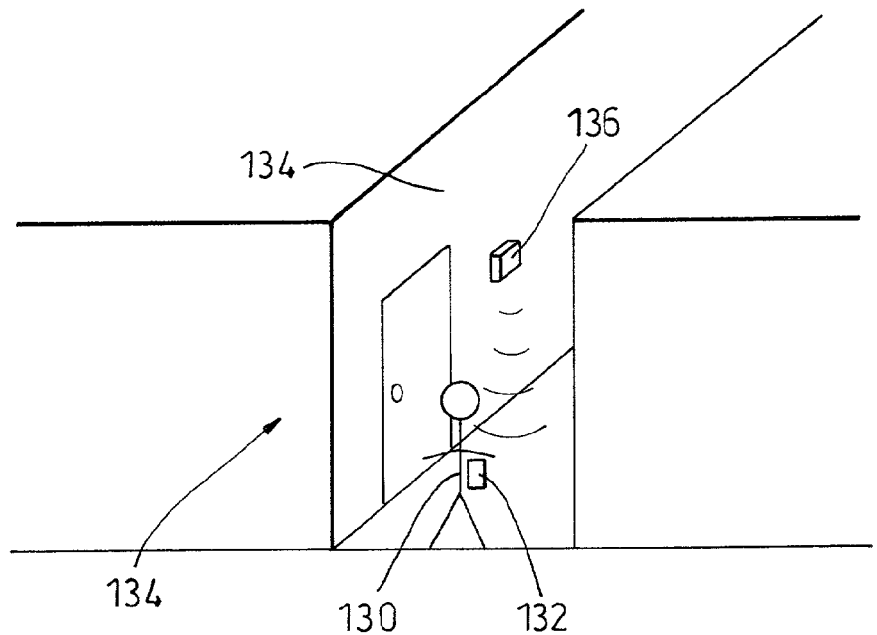

FIG. 5 schematically illustrates one way that an advertising person can create their advertisement;

FIG. 6 schematically illustrates one way that a person can configure their mobile telephone to screen out unwanted advertisements;

FIG. 7 schematically shows a building with a point of high human traffic flow provided with an advertising station;

FIG. 8 shows the visual display of a mobile telephone with some advertisements accepted on it; and FIG. 9 schematically shows an advertisement.

DETAILED DESCRIPTION OF THE DRAWING

Figure 1:
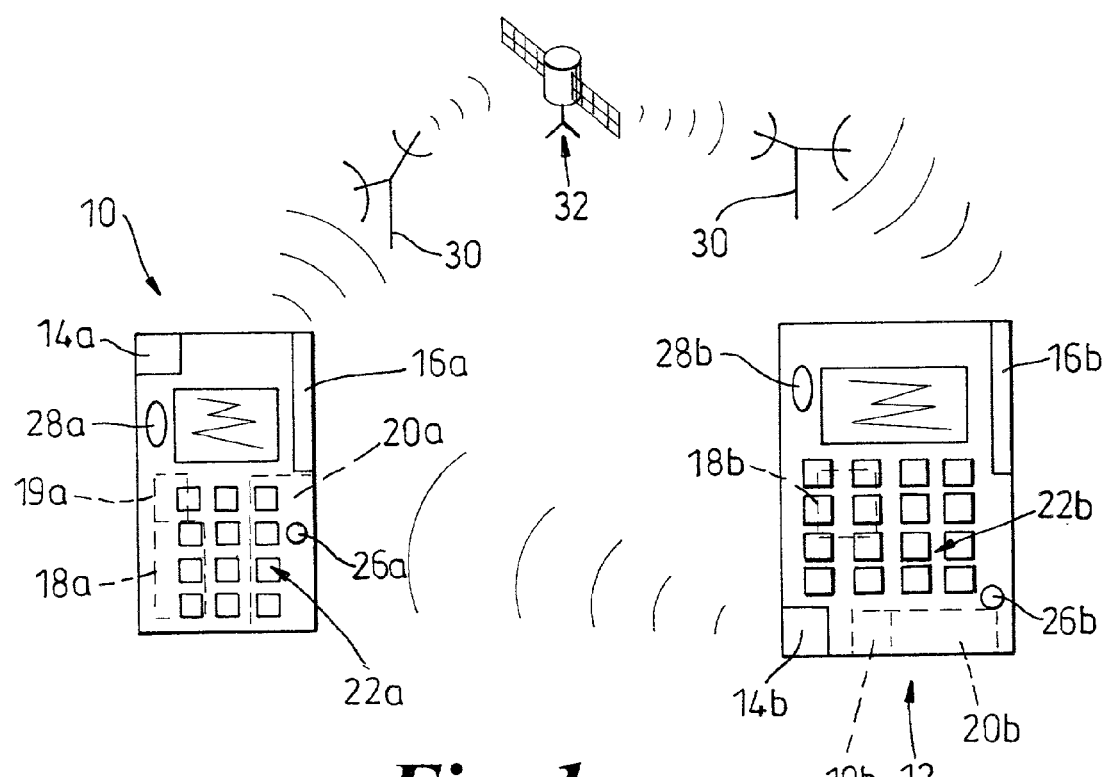

FIG. 1 shows a first mobile telephone 10, a consumer's telephone, and a second mobile telephone 12, an advertiser's telephone. Both telephones have both short-range (of the order of 10 meters or so) wideband wireless telecommunications capabilities, e.g. Bluetooth or IEEE812.11, provided by short range telecommunication antenna 14a and 14b, and they both also have long range cellular telecommunications capabilities provided by long range antenna 16a and 16b. Both telephones also have a control processor 18a or 18b, memory data storage 19a and 19b, a battery 20a or 20b, a keypad or other data input means (e.g. voice recognition) 22a or 22b, a display screen 24a or 24b, a microphone 26a or 26b, and a speaker 28a or 28b.

The two telephones 10 and 12 can communicate in a piconet via their short range telecommunication channels when they are close enough together, and can communicate via their long range antenna 16a and 16b, (and via land emitters and receivers 30, and via satellite 32) at much greater distances apart (miles, hundreds of miles, or thousands of miles apart).

Such telephones may be termed "dual mode" or "hybrid" telephones. It will be appreciated that by "telephone" is meant primarily what is conventionally thought of as being a mobile telephone, but also "mobile telecommunications device", such as a Personal Digital Assistant (PDA), laptop or palmtop computers, or even devices which have other functions, possibly even other primary functions, in addition to having short range and long range telecommunications abilities.

Figure 2:
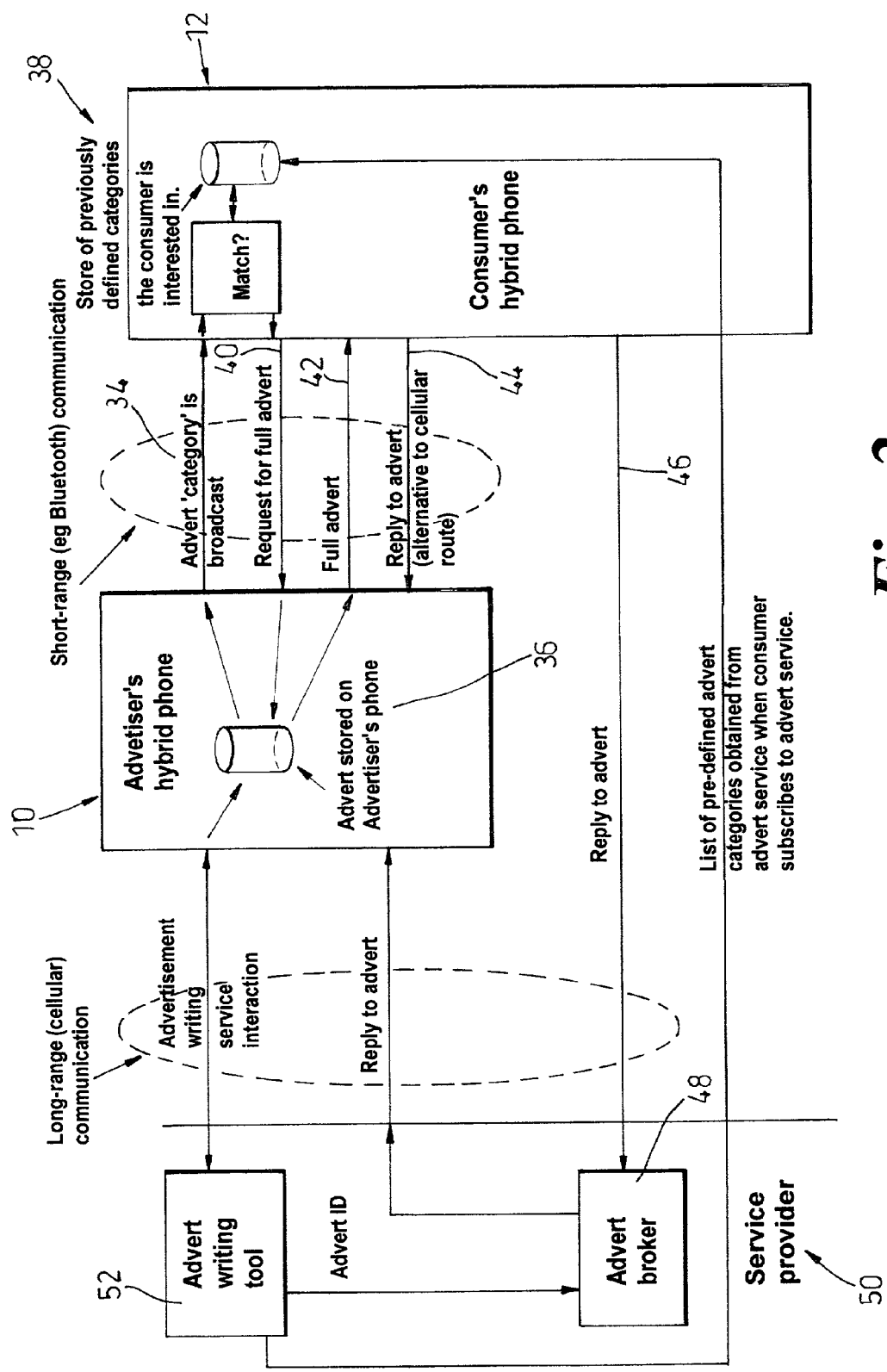

In the example of FIG. 1 and as illustrated in FIG. 2, telephone 10 is the advertiser's telephone and it has within it an electronic advertisement advertising something for sale (for the sake of example). Phone 10 has its controller 18a and memory 19a arranged so that it broadcasts, referred 34 in FIG. 2, periodically, say every 30 seconds, a short-form advertisement, or category of advertisement, using its short range telecommunications antenna 14a. The advertisement is stored in the advertiser telephone memory 19a, as mentioned in FIG. 2 at reference 36, and is recalled to an emitter circuit of the telephone periodically for broadcast.

The consumer's hybrid telephone, 12, has an advertisement filter 38 and when it receives the broadcast advertisement 34 it compares its categories or profile permissible parameters with those of its filter 38, and if there is a match to a suitable degree the consumer's telephone 12 sounds or vibrates, or otherwise alerts the consumer to the presence of an advertisement of interest. In an alternative embodiment it does not notify the consumer at this stage.

After the consumer's telephone 12 has determined that the broadcast advertisement is of interest it automatically sends out a signal via its short range telecommunications antenna 146 requesting a full advertisement from the telephone 10 (referenced 40 in FIG. 2). Upon receipt of the request for the full advertisement, telephone 10 transmits its full advertisement, again via its short range telecommunications (referenced 42). If the advertiser telephone 10 is out of piconet range (which is unlikely since the "full advertisement request" is likely to be issued within a second of receipt of the short-form advertisement), or no piconet transmitted full advertisement is received by the consumer phone 12, it may contact the advertiser via its long range telecomms, if the telecomms address of the advertiser is known.

The consumer's telephone 12 receives the full advertisement and stores it in its memory 19b. At this stage the device 12 notifies the consumer that it has an advertisement of interest (if it has not already done so). Alternatively, the telephone 12 may be configured to alert the consumer only at predetermined times (e.g. the end of the work day, or at lunch time), or at predetermined location (eg. at a consumer's home, at their office, or perhaps anywhere else but not whilst they are at certain locations (e.g. not in their car when they might be driving, and not in a main meeting room, not in a cinema etc.)

After the consumer has experienced the advertisement (it could be audio, visual, or both) they may wish to reply to the advertisement. They can do this by triggering an automatic reply dial. The advertisement category, short-form advertisement, that has already been received by the consumer's telephone 12, provided the telephone 12 with the telecommunications address of either the full advertisement, the reply address for the advertisement, or both. Alternatively the reply address may be communicated to the phone 12 by the full advertisement 42. However, the phone 12 becomes aware of the reply address, it sends a reply, referenced 44 and/or 4b in FIG. 2.

The phone 12 initially tries to reply to device 10 via the short range telecomms 14a and 14b. If that is successful then the two phones 10 and 12 can continue to communicate over, for example, Bluetooth, or the like.

If no reply connection can be established over the local piconet, the device 12 uses its long range cellular telecommunications ability, via antenna 16b, to reply to the advertisement. This is referenced 46 in FIG. 2. In FIG. 2 the reply 46 is addressed to an advertisement broker 48 which forwards the reply to the advertiser's telephone 10, possibly after removing data that would enable the device 10 to contact the device 12 directly, e.g. the address of device 10. It may be desirable to do this if the advertiser who is using phone 10 has to pay the advertisement broker to be put in direct contact with the interested customer.

The amount of data, and the content of the data, in the reply 44 or 46 may be constrained by the advertising service provider referenced 50.

When the advertiser agrees to pay the advertisement broker (if this is necessary) the advertisement broker provides the direct telecomms address of the consumer to the advertiser, or of the advertiser to the consumer, or both of their addresses to each other. It will be appreciated that the arrangement may be that the interested consumer may pay/agree to pay instead of or as well as the advertiser before they are put properly directly in touch with each other.

FIG. 2 also indicates that the service provider 50 makes available to the advertiser, via their telephone 10, an advertisement writing tool 52. This is used to ensure conformity and standardisation of short-form advertisements 34, or at least of their searchable/filterable categories, so that the filter 38 of the consumer's telephone can find those advertisements that are classed as being in the sought categories and screen out other advertisements.

Figure 3:
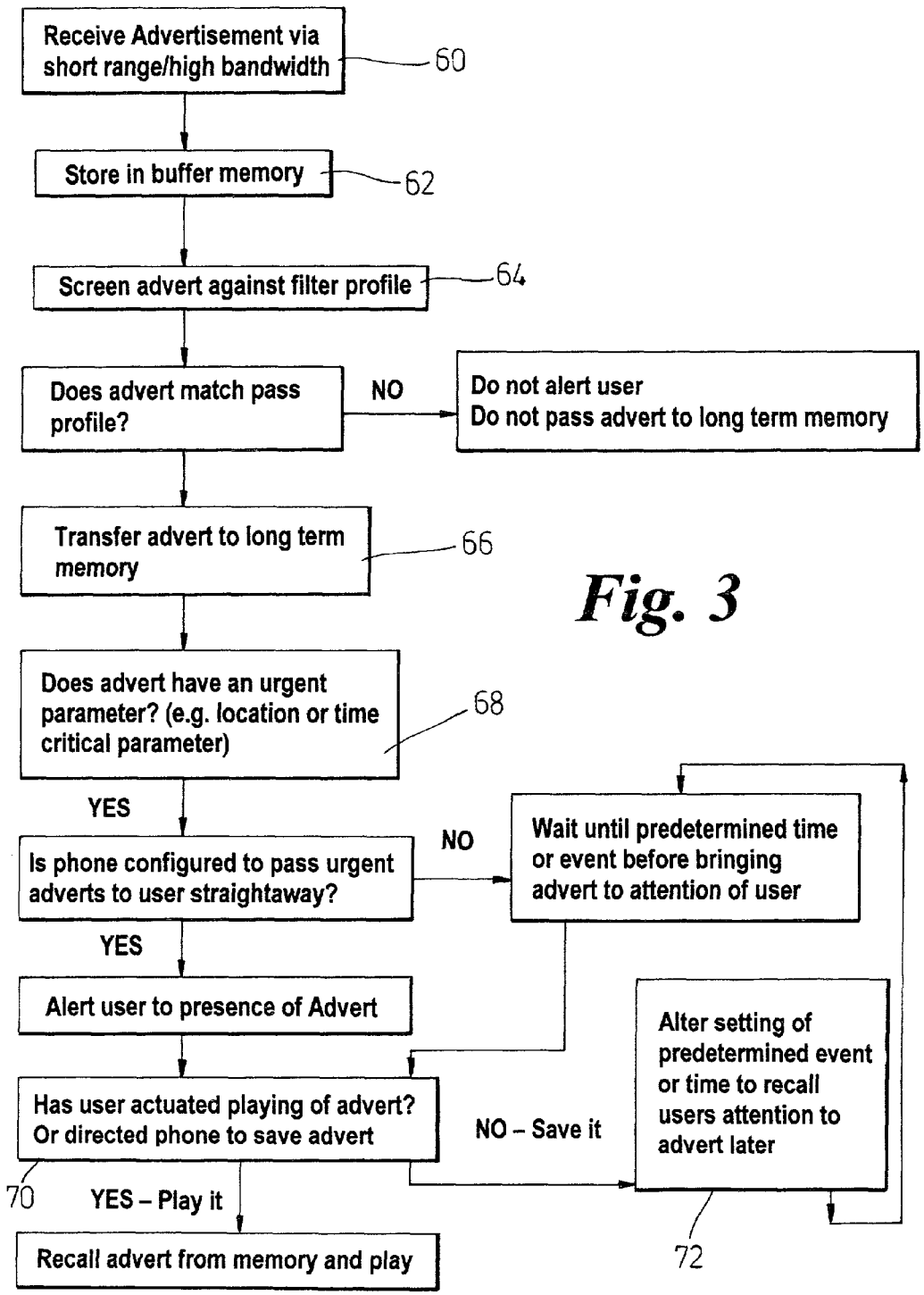
FIG. 3 is a flow diagram illustrating one way of implementing an aspect of the invention.

FIG. 3 shows a flow chart process for another embodiment of the invention. In this example the consumer's telephone 12 receives at 60 an advertisement via its short range/high bandwidth telecomms system. The advertisement, which may simply be the classification categories into which the advertisement falls, or may also include text, audio, or video, is stored in buffer memory temporarily, step 62.

The advertisement is screened, at step 64, against the pre-existing filter profile in the phone 12. If the profile of the advertisement does not match that of the filter to an acceptable degree the consumer is not alerted to the presence of the advertisement, and the advertisement in the buffer memory can be overwritten by future advertisement received by the device 12, or may even be positively deleted. If the advertisement is passed by the filter it is transferred to longer term memory of the phone 12, see step 66.

This embodiment has the feature of being able to alert a consumer of an advertisement very promptly, if appropriate to do so. This may be important if the advertisement has short range (geographical range) applicability, for example a "30% reduction in set meal cost today only" advertisement broadcast by a restaurant, or "upload newspaper now—$1" broadcast by an electronic news-stand. These are situations where the offer is either of immediate interest to the consumer or not, and there is little point in the consumer discovering some hours later that they could have had a special lunch deal hours ago, but have missed it now.

As illustrated at 68 in FIG. 3, one of the advertisement parameters is "urgency", whether that be time expiry of relevancy of advertisement, or physical location—expiry of relevance of advertisement. The phone 10 may be configured to alert a user straight-away if an advertisement in a non-screened out category is received which has an urgency flag associated with it.

The user can decide whether to play the advertisement now, or save it until later, referenced 70. If the user decides to ignore the advertisement for now they can decide not to play it, and their phone 10 saves it with an automatic recall function 72 where the advertisement is re-presented on the phone to the user for playing at either a predetermined time later (e.g. 2 hours later, provided replay time is between 8.00 am and 10.00 pm), or a set event (e.g. 5 minutes after detecting the user's home base beacon at their house, or at their office, or in their car).

Figure 4:
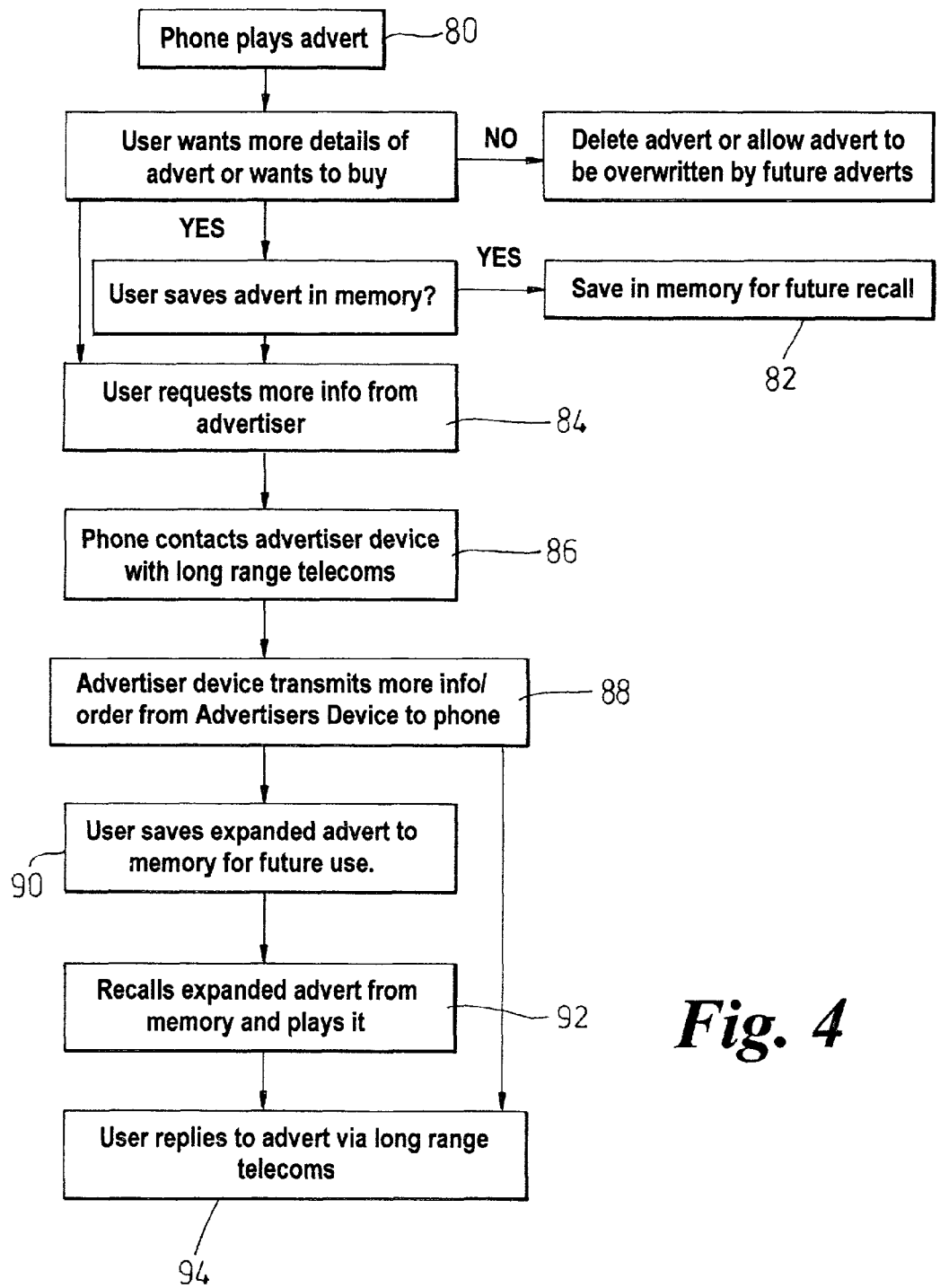
FIG. 4 is a flow diagram illustrating one way of implementing the playback of a captured advertisement.

FIG. 4 illustrates the configuration of one embodiment of the invention, after a consumer has decided to play the advertisement (reference 80). The user may decide to save an advertisement they had played back to them to memory (step 82) or they may leave the advertisement in temporary memory and deal with it/enquire further with the advertisement temporarily stored. Either way, there comes a time when the user would like to reply to the advertisement, or to request more details, step 84. The phone 12 contacts an advertiser device via its long distance telecomms, step 86. This advertiser device could be another mobile device, or the device which transmitted the advertisement (which very well may be a mobile device) or it could be a separate, different, device, e.g. an Application Service Provider Server.

The advertiser device transmits more information to the consumer device 10 via the long distance, e.g. cellular, network. The device 10 saves the expanded advertisement, with the extra information to memory, step 90 (possibly temporary memory, or possibly long term memory). The user can reply to the advertisement via long range telecomms 94.

FIG. 5 shows one possible implementation of how an advertiser may create an advertisement on their advertising device. There is an Application Service Provider (ASP) who can be contacted by the advertising device via long range telecomms (e.g. internet or cellular, referenced 106). The advertising person types in their advertisement using free text, step 108, typically via their mobile telephone or PDA. The ASP has an ASP Advertisement Writer Tool which takes the free text advertisement and, using a set of algorithms and rules, coverts it into a constrained format, step 110, where only selected predetermined words can be used in the advertisement, and creates an advertisement classification profile which accompanies the constrained text. The constrained text advertisement and the automatically generated advertisement category profile are presented to the advertiser for review, step 112, possibly along with selected other categories that the user may care to add to the automatically generated categories, or exchange for them. The user may be able to delete or change the automatically generated categories: see step 114. The completed advertisement is then transmitted to an advertising station, see step 116. This advertising station may be the advertiser's device (e.g. phone), or it could be a separate advertiser station, e.g. a site where a lot of people pass by.

FIG. 6 shows the setting of an advertisement filter for a mobile phone. The telephone 12 (consumer) telephones the ASP, step 120, and the consumer is presented with a display of possible filter categories, for example: holidays, sport, cars, under $100, under $50, $1000-$5000, clothes, male/female, age target, geographical vicinity of advertiser to be within specific distance of consumer phone (GPS/position sensors may be provided, or just short range capabilities may set the allowable geographic spectrum), food, financial, news, music etc.

The user selects, in step 122, which categories are to be excluded and which are to be included. In this example the ASP gives weightings to other non-specifically indicated categories, dependant upon what has been screened positively in and out of the filter profile, and may pass to the consumer non-specifically screened in, or screened out, advertisements that have a high enough weighting/point score. In this example the user is required specifically to select whether to allow urgency flags to trigger an immediate advertisement alert (if the advertisement if the advertisement passes the rest of the filter) or not, step 124.

When the user has set their filter profile on the ASP it is downloaded from the ASP to the phone, step 126, and the user disconnects from the ASP.

FIG. 7 shows one possibility. A user 130 and their mobile phone 132 are in a shopping mall 134 and as they pass a bookstore 134 an advertiser device 136 broadcasts an advertisement on a short range wideband emitter to the mobile phone 132. The advertisement offers a special deal on certain books, e.g. the top 10 best sellers, if the books are bought in the next few hours or days.

The advertiser device 136 (or a similar device associated with another organisation, not necessarily the example given) may emit electronic vouchers or coupons, redeemable against certain goods or services, possibly with a time expiry date.

It will be appreciated that a static advertiser device can reach a lot of people if it is in a busy place such as a shopping mall, turnstile or doorway of a building, or a transport station, such as a train or subway station. A mobile advertiser station, e.g. in a train or taxi, or even carried by a person (e.g. their mobile phone) may be in piconet contact with a great many other devices over a period of time.

Some advertisers may pay some people or organisations to carry their advertisements. For example a company may agree to contribute to a mobile telephone bill if the mobile telephone carries their advertisement and broadcasts it. An amount per enquiry originating from their telephone, or a "rental" fee payable to the owner of the device may be envisaged.

The advertisement could be on offer to sell or supply, or a request to buy or receive.

It will also be appreciated that it may be preferred in some situations to ensure that the reply to an advertisement is transmitted via long range telecommunications, or at least not let the advertiser know that the reply has come via short range telecomms. It can be awkward for a potential customer if a seller/advertiser knows that there is such a potential customer (i.e. someone whose telecomms device has replied to their advertisement) within a few meters of them—in a piconet with them.

The advertisement may take the form of an auction, or reverse auction. An item may be open for bids for a fixed time period and then sold to the highest bidder (or in the reverse auction scenario, the lowest bidder).

A benefit of using a wideband link for the short-form advertisement is that it makes the transmission time of a short form advertisement short, for example less than one second is envisaged. The transmission of the full advertisement and associated details, over Bluetooth or other short range telecomms, might be of the order of a few seconds. The data rate envisaged for the short range telecomms is of the order of 500 kbits/second or better. Perhaps ten times that, or better can be achieved. Video clips may be transmitted.

The short range wideband link may have a data rate that is perhaps 10 to 1000 times as great as that of the long distance telecomms link. In an alternative embodiment the data rates may vary by a factor of <2, 2, 5, 10, 50, 100, 500, 1000, or more, or by an amount defined by a range between any of those values.

Although primarily described in relation to advertisements, the invention is potentially applicable to other situations where a first tranche of data is provided to a user who may or may not want a further tranche of data, for example abstracts of documents may be distributed via short range piconet links, with users able to obtain fuller text via long range telecomms (and there may or may not be a cost payable to the host/ASP/database for the fuller text).

The fact that the piconet advertisements are necessarily originating from a local source may be attractive. The invention may be thought of as the broadcasting and filtering of local advertisements over a piconet, with the probable provision of a writing tool (e.g. WAP based) and the possible provision of a broker for responses to advertisements that come back via the cellular network or piconet.

FIG. 8 shows a mobile telephone 140 having an LCD display 142. There are five advertisements currently in the memory of the phone 140, and being displayed on display 142. These advertisements are short-form, category-only advertisements. The phone 142 is still in piconet contact with the advertiser device(s) that is/are transmitting the short-form advertisements. The user selects which advertisement to enquire about by using the up/down controls 144, 146 and, in this example chooses advertisement number 3, Parking Availability. Local. In this example those advertisements which carry a "local" flag/characteristic have "local" next to them on the display 142 so that the user can tell they are local.

The user presses the "send" button 148 (or "yes" button) when advertisement 3 is selected and the phone 140 transmits a piconet signal broadcast generally. The piconet advertiser device that is advertising parking space then sends back details of where the parking space is, and how much it costs. In this example the advertiser device does not make a charge for fleshing out the short-form advertisement. The user can now drive to the car parking space knowing that it is close. Whilst each piconet device has a range of the order of a few meters to tens of meters, a piconet in a city, for example, could extend hundreds of meters due to piconet devices passing on messages to other piconet devices in the piconet. Thus the car parking space can be much further away from the phone 140, even if the advertising device is in the car park (which it need not be).

Item 5 on the display 142 illustrates another characteristic label that may be displayed with the short form advertisement: whether the advertisement is from a commercial organisation or a private individual (i.e. word "PRIVATE" indicates private individual's advertisement).

FIG. 9 shows an advertisement 150 having text 152 to be displayed on the screen of a consumer's telephone, and classification codes 154 that are not displayed, but that are used by the advertisement filter of the consumer's phone to determine whether the consumer wishes to know about the advertisement. It has both "SELL" and "BUY" codes since the advertiser is both looking to part with a dog and to acquire toys.

The phone 140 presents the advertisement categories 1 to 5 initially as text only. The list of advertisements on its display may be a limited number of advertisements, limited to the best matches to the filter. The list may be a rolling list which is scrollable through advertisements received, either manually scrollable or automatically scrolling. The phone may have no filter.

To return to an overview of embodiments of the invention: It will be apparent that the advertisement of short range high bandwidth wireless technologies such as Bluetooth will give rise to a new class of hybrid mobile phones that combine both a long range cellular link with a separate short range wireless link in the same device. With such hybrid phones, it will be possible to communicate via the cellular link, passing information received directly on through the short range link to nearby devices, and vice-versa. The present invention takes advantage of this to provide an advertisement service that uses these hybrid phones to broadcast advertisements, receive advertisements and respond to these advertisements.

The advertiser preferably broadcasts only a minimal advertisement to those in the vicinity, typically the advertisement category. If there is a match of interest in the consumer's phone, the consumer's phone then requests the full advertisement details which are quickly transferred over the short range link. This "advertisement transaction" will happen very quickly, and because of the short range communication that is used, by the time the consumer has had time to consider the advertisement the advertiser may be out of range. Thus, there is proposed a response route via the long range cellular network. The consumer indicates on his phone his desire to purchase the item, and signals this back via the cellular network. The advertisement broker matches the ID of the advertisement with that of the advertiser and passes on a message to the advertiser informing him of the consumer's interest.

The wireless nature of the short and long range telecomms envisaged is attractive.

The service provider, or advertising device could provide an auction, or other value-added services.

Each mobile phone or PDA could be viewed as a walking billboard. It is of course possible to configure a phone to respond to accept no advertisements.

It will be appreciated that in the prior art a user who wants to have details of a lot of documents/data (e.g. advertisements) from a remote site has been able to transmit the database to themselves and to discard what they do not want. This is very wasteful in telecommunication capacity and requires a great deal of bandwidth, and also a lot of memory at the receiving device.

The present invention reduces the amount of data that is carried via telecommunications, and that is stored (albeit temporarily), in comparison with transferring everything and then discarding at the user's end.

An alternative known system is for a user to type in a search strategy to a computer to instruct a remote database host to perform a search for the data of interest and to transmit to the user via telecommunications just the result of the database search. However, this does not lend itself very well to the situation such as advertising where a user does not know that there is data that they might like to see (because they would not know to type in an appropriate search command). Some embodiments of the present invention positively, and proactively, draws to the attention of a user opportunities to discover more about a data record.

Some embodiments of the invention transmit relatively large volumes of data over high bandwidth, cheap (or even free-to-air) short range wireless transmissions. This avoids congesting land lines, or long range cellular networks. These embodiments may restrict the use of the long range wireless telecommunications, which typically are more expensive in transmission costs and are often more congested, to smaller volumes of data, and/or to data that is known to be of interest (rather than speculative unsolicited data). This can improve the overall availability of the long distance e.g. cellular network, the connection rate for successful connections, and can reduce the rate for connections being unexpectedly terminated.

By having the advertisement writer and filter creator at a remote site, the mobile consumer and advertiser devices can potentially have simpler microprocessors/software stored on them, and require less processing power and memory than they otherwise would, since the software and databases used to create the advertisements and filters need not be stored in them, or be operable in their processor chips.

By having advertisements, or other data, broadcast at low power over a short range piconet by an advertiser device (e.g. mobile telephone), it is possible to avoid using high power, longer distance, transmitters, and the power density of radiation in the environment may be kept down (in comparison with having a big long range transmitter). This may help reduce electromagnetic "pollution" of the electromagnetic environment, and may reduce the likelihood of signals interfering with other things undesirably.

The invention claimed is:

1. A method of advertising comprising:
   receiving, at a consumer telecommunications device, a first part of an advertisement broadcast via a short range link from an advertiser telecommunications device;
   receiving a second part of the advertisement at the consumer telecommunications device, wherein the second part of the advertisement is received from the advertiser device by the consumer device after the consumer device has screened the first part of the advertisement;
   replying to the advertisement by sending a reply message including message data from the consumer telecommunications device to an advertisement broker device;
   changing the message data of the reply message at the broker device to derive a changed reply message that includes at least a substantial portion of the reply message; and
   communicating the changed reply message from the broker device to the advertiser telecommunications device.

2. The method according to claim 1 in which the advertisement is received at a man portable consumer device.

3. The method according to claim 1 in which the consumer telecommunications device is a hand-holdable portable and pocketable device.

4. The method according to claim 1 in which the advertisement is broadcast from a man portable advertiser device.

5. The method according to claim 4 in which the advertiser device is a hand-holdable portable device.

6. The method according to claim 1 in which the advertiser telecommunications device does not include its own telecommunications address in the advertisement.

7. The method according to claim 6 further including the step of including a telecommunications address of the broker device in the advertisement broadcast by the advertiser telecommunications device.

8. The method according to claim 1 further including the steps of including one or more advertisement classification codes in the advertisement broadcast by the advertiser telecommunications device, and comparing the one or more advertising classification codes with allowable advertisement codes in an advertisement screening operation by the consumer telecommunications device.

9. The method according to claim 8 in which the consumer telecommunications device stores or brings to the attention of a user only those advertisements which are passed by the screening operation that the consumer telecommunications device performs on the broadcast advertisements that the consumer telecommunications device receives.

10. The method according to claim 1 in which the consumer telecommunications device replies to an advertisement via long range telecommunications to the advertiser telecommunications device.

11. The method according to claim 1 comprising using a mobile telephone, personal digital assistant, or other small portable electronic devices for both the advertiser telecommunications device and the consumer telecommunications device, the advertiser and consumer telecommunications devices both having both piconet short range and long range telecommunication capabilities.

12. The method according to claim 1, wherein the change to the reply message includes augmenting the reply message.

13. The method according to claim 1, wherein the change to the reply message includes modifying original text of the reply message.

14. The network according to claim 13, wherein the original text is modified by removing an identifier of a consumer.

15. The method according to claim 1, wherein the broker device is interposed in a telecommunications link between the advertiser device and the consumer telecommunications device.

16. The method according to claim 1, wherein the reply message communicated from the broker device to the advertiser telecommunications device is changed by the broker device changing the message data sent by the consumer telecommunications device by augmenting the message data in the reply message sent by the consumer telecommunications device to the broker device.

17. The method of claim 1, further including receiving additional advertisement information from the advertiser telecommunications device by the consumer telecommunications device in response to a request for additional information by the consumer telecommunications device to the advertisement.

18. The method according to claim 1 wherein the broker device changes the message data by blocking passage of at least one of (i) advertiser details to the consumer device and (ii) consumer details to the advertiser device.

19. The method according to claim 18 wherein the broker device changes the message data by blocking passage of the address of the advertiser telecommunications device to the consumer telecommunications device.

20. The method according to claim 1, wherein the reply message communicated from the broker device to the advertiser telecommunications device is changed by the broker device changing the message data sent by the consumer telecommunications device by deleting some of the message data in the reply message sent by the consumer telecommunications device to the broker device.

21. A server adapted to act as an advertisement broker device contactable via wireless telecommunications with a consumer device, the server including an arrangement adapted to (a) receive one of (i) an advertisement message from an advertiser device or (ii) a reply message to an advertisement from the consumer device, and (b) forward the received message to a remote telecommunications device; the arrangement being adapted to modify the received message so as to ensure, at least initially, that no telecommunications address of an advertiser or replier to the advertisement is passed with the modified message that is forwarded by the server, wherein the advertisement has a first part and a second part, the second part being sent from the advertiser device to the consumer device after the consumer device has screened the first part.

22. The server of claim 21, wherein in at least one of the advertisement message or the reply message includes a telecommunications address and the server is adapted to remove the telecommunication address from at least one of advertisement data and the reply message to ensure that no telecommunication address of the advertiser or replier is passed with the message forwarded by the server.

23. A network comprising:
an advertiser device comprising a first telecommunications device having both a short range transmitter and receiver unit, and a long range telecommunications transmitter and receiver, a memory, and a processor, the memory including an advertisement;
a consumer device comprising a second telecommunications device, having: (a) a short range, piconet transmitter and receiver unit, (b) a long range telecommunications transmitter and receiver unit, (c) a second memory, and (d) a control processor, the second memory or the control processor of the consumer device having an advertisement receiver which, in use, is capable of receiving and storing the advertisement, wherein the advertisement has a first part and a second part, and wherein the advertisement receiver is configured to receive the second part of the advertisement from the advertiser device after the consumer device has screened the first part;
and an advertisement broker device contactable via wireless telecommunications with both the advertiser and consumer devices, the broker device being adapted to selectively (a) pass advertiser details to the consumer device in response to triggering, (b) pass consumer details to the advertiser device in response to triggering, and (c) block passage of at least one of (i) advertiser details to the consumer device and (ii) consumer details to the advertiser device.

24. The network according to claim 23 in which the broker device is connectable with the advertiser device and the consumer device via long range wireless telecommunications.

25. The network of claim 23 wherein each the telecommunications devices includes a hybrid mobile telephone.

26. The network of claim 23, wherein the advertisement broker device includes a server adapted to receive one of (i) an advertisement message or (ii) a reply message to an advertisement and to forward the received message to a remote telecommunications device; the server being adapted to modify the received message so as to ensure, at least initially, that no telecommunications address of an advertiser or replier to an advertisement is passed with the message that is forwarded by the server.

27. The network of claim 23 wherein the broker device is arranged, during passing of details of the advertiser to the consumer device, to block passage of the address of the advertiser telecommunications devices to the consumer telecommunications device.

28. The network of claim 23 wherein the advertisement broker device is adapted to block passage of both (i) advertiser details to the consumer device and (ii) consumer details to the advertiser device.

29. A network comprising:
an advertiser device comprising a first telecommunications device having both a short range transmitter and receiver unit, and a long range telecommunications transmitter and receiver, a memory, and a processor, the memory including an advertisement;
a consumer device comprising a second telecommunications device, having (a) a short range, piconet transmitter and receiver unit, (b) a long range telecommunications transmitter and receiver unit, (c) a second memory, and (d) a control processor, the second memory or the control processor of the consumer device having an advertisement receiver which, in use, is capable of receiving and storing the advertisement, wherein the advertisement has a first part and a second part, and wherein the advertisement receiver is configured to receive the second part of the advertisement from the advertiser device after the consumer device has screened the first part; and
an advertisement broker device contactable via wireless telecommunications with both the advertiser and consumer devices, the broker device being adapted to selectively (a) pass consumer details to the advertiser device in response to triggering and (b) block passage of at least one of (i) advertiser details to the consumer device and (ii) consumer details to the advertiser device.

30. The network of claim 29 wherein the broker device is also adapted to selectively pass advertiser details to the consumer device.

31. The network of claim 29 wherein the advertisement broker device is adapted to block passage of both (i) advertiser details to the consumer device and (ii) consumer details to the advertiser device.

* * * * *